(No Model.)

G. H. KELLER.
SPRING FISH TRAP.

No. 384,853. Patented June 19, 1888.

WITNESSES:
H. N. Rosenbaum
Sidney Mann

INVENTOR:
Georg Heinrich Keller
BY Goepel & Raegener
ATTORNEYS.

UNITED STATES PATENT OFFICE.

GEORG HEINRICH KELLER, OF NEW YORK, N. Y.

SPRING FISH-TRAP.

SPECIFICATION forming part of Letters Patent No. 384,853, dated June 19, 1888.

Application filed December 2, 1887. Serial No. 256,747. (No model.)

*To all whom it may concern:*

Be it known that I, GEORG HEINRICH KELLER, of the city, county, and State of New York, have invented certain new and useful Improvements in Fish-Traps or Spring-Hooks, of which the following is a specification.

This invention has reference to that class of fish-traps or spring-hooks in which the hook and line, when pulled by the fish taking the bait, operate a trigger and release the spring by which the hook is suddenly jerked into the mouth of the fish biting, so as to prevent the release of the same from the hook when hauling in the same; and the invention consists of a fish-trap composed of an exterior casing provided at the upper end with an eye for the line and at the lower end with a sliding and spring-actuated trigger that is provided with an eye for the lower section of the line to which the sinker and hook is applied. The trigger engages a recess in the circumference of a spring-barrel to which the upper and lower sections of the line are applied, the lower section of the line being further provided with a knot by which the trigger is thrown out of engagement with the spring-barrel whenever a pull is exerted on the lower part of the line by the fish taking a bite.

Figure 1:
Figure 2:
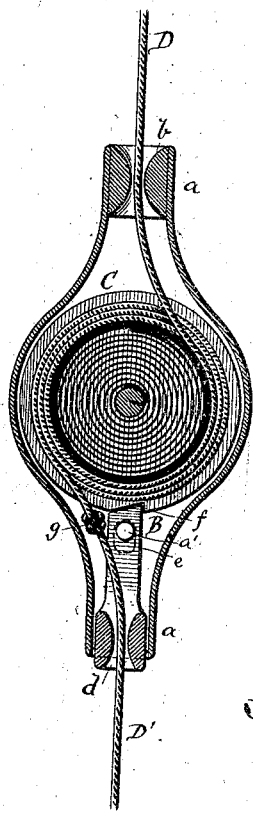
Figure 3:
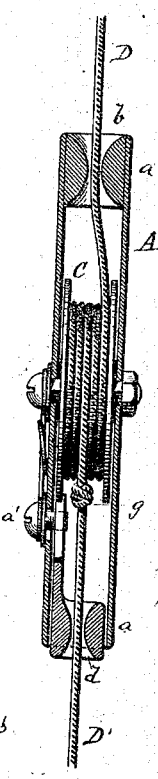

In the accompanying drawings, Figure 1 represents a side elevation of my improved fish-trap or spring-hook. Figs. 2 and 3 are respectively a vertical longitudinal and a vertical transverse section of the same, drawn on a larger scale; and Fig. 4 is a vertical longitudinal section of a modified form of trap, showing the interior spring-barrel in side elevation.

Similar letters of reference indicate corresponding parts.

In the drawings, A represents a casing, which is provided at diametrically-opposite points with elongated portions or necks $a\,a$, the upper neck being provided with a stationary line guide or eye, $b$, for the upper section of the line, while in the lower elongated portion is arranged a trigger, B, that is provided with a line guide or eye, $d$, for the lower section of the line. The trigger B is provided with a fixed pin or stud, $a'$, which passes through the casing A, and is guided in a slot, $e$, of the same. The trigger B is acted upon by a spring, $e'$, which is arranged at the outside of the casing, as shown in Fig. 1. The spring $e'$ may also be arranged at the inside of the casing, as shown in Fig. 4, it being interposed between a shoulder of the trigger and a shoulder at the end of the lower neck $a$ of the casing. In this case the trigger is connected by a pivot-link, $e^2$, with the casing A, as shown in Fig. 4. When thus arranged, the spring is protected against contact with exterior objects. On a fixed spindle of the casing A is arranged a spring-barrel, C, which is provided with circumferential flanges, one of the flanges having a notch, $f$, that is engaged by the trigger B. To the spring-barrel C is applied the upper section, D, and the lower section, D', of the line, the upper section extending through the eye $b$ to the fishing rod and reel, while the lower section is provided with a sinker and hook, in the usual manner. The lower line section, D', is provided with a knot or stop, $g$, which engages the eye $d$ of the trigger B whenever the fish takes the bait. The strain of the knot or stop $f$ on the eye $d$ of the trigger B produces a downwardly-sliding motion of the latter, so that it clears the notched flange of the spring-barrel C, which is thereby instantly turned on its axis by the action of its spring, so as to wind up both the lower and upper line-sections, D D', and produce by the sudden jerk imparted thereby to the hook the piercing of the mouth of the fish, so that the same cannot escape from the hook when hauling in the line.

Figure 4:
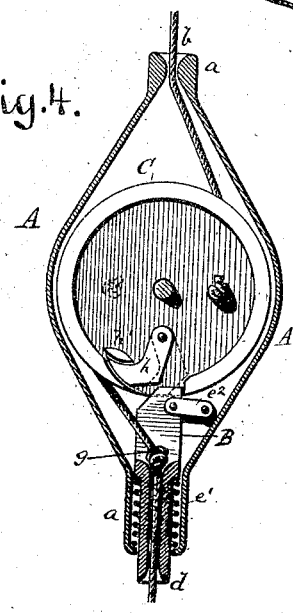

For the purpose of permitting the spring-barrel to make several rotations, the same is provided with a filling-piece, $h$, that is pivoted to the side of the barrel C, and adapted to be moved on the turning of the same by gravity into the recess or notch $f$ of the trigger, as shown in dotted lines in Fig. 4, until the sinker arrives at the lower neck $a$ and stops the motion of the spring-barrel. In unwinding the line-sections for the purpose of setting the trap, the filling-piece $h$ drops against a stop, $h'$, at the side of the spring-barrel C and permits the pawl to re-engage the recess $f$ of the spring-barrel, so as to set the trap for the next fish. When the fish is hooked by the release of the spring-barrel and the quick winding up of the line, the latter can be pulled in at leisure without giving the fish a chance to escape, as the hook has sufficiently taken hold of the mouth of the fish to prevent it from playing loose therefrom.

The advantages of my improved fish-trap are that all the parts are compactly inclosed and protected by the casing, and not liable to be released except by the strain exerted on the trigger when the fish takes the bait, and that the device also acts as a sinker, owing to the weight of the casing and spring-barrel.

Having thus described my invention, I claim as new and desire to secure by Letters Patent—

1. The combination of an exterior casing having a line guide or eye at the upper end, a spring-actuated trigger at the lower end, said trigger being provided with a line guide or eye, a spring-barrel at the interior of the casing provided with a notched flange, and upper and lower line sections attached to the spring-barrel, the lower line-section being provided with a knot for engaging the trigger and releasing the spring-barrel, substantially as set forth.

2. The combination of an exterior casing, a spring-actuated trigger, a spring-barrel having a notched flange, a filling-piece and stop at the side of the spring-barrel, an upper line-section attached to the spring-barrel, and lower line-section also attached to the barrel and provided with a knot for engaging the trigger, substantially as set forth.

In testimony that I claim the foregoing as my invention I have signed my name in presence of two subscribing witnesses.

GEORG HEINRICH KELLER.

Witnesses:
JOHN A. STRALEY,
PAUL GOEPEL.